(12) United States Patent
Newman

(10) Patent No.: US 6,633,668 B1
(45) Date of Patent: Oct. 14, 2003

(54) DEVICE INDEPENDENT IMAGE COMPRESSION AND COLOR MANAGEMENT

(75) Inventor: Todd Newman, Palo Alto, CA (US)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/352,169

(22) Filed: Jul. 12, 1999

(51) Int. Cl.[7] .................................................. G06K 9/00
(52) U.S. Cl. ........................ 382/166; 358/523; 358/539
(58) Field of Search ................................ 382/166, 162, 382/167; 358/523, 539, 515, 516, 518, 520

(56) References Cited

U.S. PATENT DOCUMENTS

| | | | |
|---|---|---|---|
| 5,463,480 A | 10/1995 | MacDonald et al. | 358/520 |
| 5,634,092 A | 5/1997 | Stokes | 395/118 |
| 5,754,184 A * | 5/1998 | Ring et al. | 345/431 |
| 5,754,448 A | 5/1998 | Edge et al. | 364/526 |
| 5,835,627 A | 11/1998 | Higgins et al. | 382/167 |
| 6,480,299 B1 * | 11/2002 | Drakopoulos et al. | 358/1.9 |

OTHER PUBLICATIONS

"An Evaluation of Colour Models' Performance Using Image Compression Algorithms", Shao Ying Zhu and M. Ronnier Luo [Extended Abstract for the IS&T/SID Seventh Colour Imaging Conference '99].

"A Comparison of CIELAB and CIECAM97s", Nathan Moroney, The Sixth Color Imaging Conference: Color Science, Systems, and Applications.

"The Power of ColorSync Color Matching", Bruce Fraser, Mac Publishing, L.L.C., p. 105, Jun. 1998.

"Perfect Color White Paper—Build your Own Color Server", http://222.color.com/Perfect/White_papers3.html, visited Jun. 21, 1999.

"Specifying color for photographic images", ISO/IEC JTC1/SC29/WG1 N1293, J. Scott Houchin, Eastman Kodak Company, Jul. 2, 1999.

International Color Consortium Profile Format, ICC 3.0a, http://vera.inforamp.net/~poynton/ICC_3.0a, visited Jun. 21, 1999.

* cited by examiner

Primary Examiner—Yon J. Couso
(74) Attorney, Agent, or Firm—Fitzpatrick, Cella, Harper & Scinto

(57) ABSTRACT

The management of color image data, said color image data provided in a source device color space from a source device having a source device color profile, wherein the source device color profile is accessed and used to transform the color image data from the source device color space to a color space that is both device and viewing condition independent, thereby creating device-independent color image data, after which the device-independent color image data is compressed. The compressed, device independent color image data can then be accessed for decompression and color management prior to output on a destination device.

39 Claims, 5 Drawing Sheets

DEVICE INDEPENDENT IMAGE COMPRESSION AND COLOR MANAGEMENT

BACKGROUND OF THE INVENTION

1. Field of the Invention

The invention concerns the combination of image compression and color management by creating a color image file wherein the color image data is provided in a color space that is both device and viewing condition independent and wherein the color image data is compressed. The color image file thereby allows convenient transfer of the color image data for output on a destination device, whereupon the transformation of the color image data to the color space and determination of the gamut boundary of the destination device does not require the color profile of the source device.

2. Description of the Related Art

Color images are typically encountered in computing environments for display on monitors and for printing on color printers. With the growing popularity of the Internet and of digital color devices such as digital cameras and digital video cameras, the use of color images in computing environments has, and will continue to, increase significantly. Data corresponding to a color image is commonly stored in a data file provided on some type of recording medium, such as a hard disk, floppy or CD-ROM, thereby allowing the color image data to be transferred for output to other devices.

Color image data is provided to a computer or computing device from a variety of input devices, such as scanners, floppy disks, CD-ROMs, the Internet, digital cameras and digital video cameras. The color image data can then be viewed by sending it to a variety of output devices such as monitors, printers, digital projectors, digital cameras and digital video cameras. Generally, such input and output devices operate in a specific device dependent color space. Since different devices use different combinations of media, colorants and the like, with outputs being viewed under different viewing conditions, any one image will appear to differ in color from one device to another. For instance, a monitor typically utilizes red, green and blue light on a black screen to generate a color image and therefore is said to operate in RGB color space. A printer, on the other hand, typically generates color by combining inks of the colors cyan, magenta, yellow and black on a white medium and therefore is said to operate in CMYK color space. To further complicate matters, although two devices may operate in the same color space, they may not mix colors in the same fashion to achieve the same color appearance. The characteristic way in which a device reproduces color is often referred to as the device's color space. Information that describes the device's color space is referred to as a device color profile.

In addition to the different color spaces, and the different ways in which the colors of a single color space can be mixed and represented, there is also a significant variation in the gamut of colors that each device is capable of representing under given viewing conditions. For instance, a monitor may only be capable of displaying a limited range of the color red, while a printer may be capable of displaying a wide range of the color red. The measurement of this color range limitation is commonly referred to as the color gamut boundary of the device and it describes the color gamut limitations of the device under certain viewing conditions.

Because of differences in color reproduction characteristics between devices, conventional color management systems are commonly utilized to ameliorate the detrimental effects that differing device color profiles may ultimately introduce into the appearance of a color image from its initial recordation by an input device to its eventual display on an output device. Conventional color management systems attempt to make the color image appear the same regardless of the input and output devices that are used by transforming the color image data contained in the image data file from the color space and color gamut boundary of the input device to the color space and color gamut boundary of the output device. Many color management systems provide a preferred reproduction of the color image instead of trying to make the color image appear the same. This color management process commonly requires the use of the device color profile for the input device and the device color profile for the output device. A color profile provides information regarding the color space that is utilized by the particular device and the manner in which it is utilized.

As a further consideration, because of the size of color image files, color image data is typically maintained in a data file which is in a standard compressed format, such as the JPEG format (Joint Photographic Experts Group). To achieve the JPEG format, the color image data is transformed from the initial color space of the source device, such as RGB, into an interim color space, such as YUV, which is more efficiently compressible. YUV color space is the colorimetry commonly used in broadcast television, where Y is a luminance signal and U and V are chrominance signals. The image data is sampled and compressed using a discrete cosine transform (DCT) algorithm in which the cosine coefficients are quantized and converted to integers. A wavelet-based compression algorithm is utilized in place of the DCT algorithm according to the emerging JPEG 2000 standard. The image data is further compressed using Huffman encoding and is then placed in a JPEG file. The JPEG file can then be transferred to another computing device after which the image data is decompressed and retransformed from YUV to RGB so as to recover the original source image data in RGB color space, albeit with some loss due to compression. Thus the JPEG scheme involves an end-to-end process wherein the color space of the image data at the beginning of the process is the same as the color space of the image data at the end of the process. The recovered RGB image data can then be transformed to the color space that corresponds to the destination device, such as CMYK color space for a printer, after which the image data is sent to the destination device for output.

As mentioned above, however, the transformation of image data from the color space of a source (input) device to the color space of a destination (output) device can introduce significant variation in appearance of the image when ultimately output on the destination device. For this reason, a color management process is often introduced after decompression and retransformation of the JPEG file into decompressed RGB color image data. As discussed above, conventional color management systems utilize at least two color profiles, one from the source device and one from the destination device, in order to match the appearance of the color image data from the color space and color gamut boundary of the source device into the color space and color gamut boundary of the destination device.

For example, a color management system currently being worked on for the International Color Consortium (ICC) Reference Implementation utilizes device profiles which are based upon a standardized color model. The ICC color management system utilizes what is known as an ICC device profile for the source device and for the destination device.

An ICC device profile includes a device specific color appearance look-up table and a device specific gamut boundary description. A color management module (CMM) is implemented which, after decompression of a JPEG image file, takes the decompressed, recovered color image data in RGB color space and then transforms it to a standardized, color space that is both device and viewing condition independent, such as Jab, according to a standard such as the International Commission on Illumination's (CIE) Colour Appearance Model (CAM), CIECAM97s JCh color space. Jab color space is a rectangular coordinate system version of the JCh color space cylindrical coordinate system in which J is lightness, C is chroma, and h represents hue. This standardized color space represents the image's appearance independently of any particular device or viewing conditions.

In this example, the transformation to this standardized color space is performed by utilizing the device specific color appearance look-up table of the ICC device profile for the source device. After the transformation to the Jab color space, the device specific gamut boundary descriptions of the source device and of the destination device are then utilized to map the color gamut of the image data to fit within the color gamut of the destination device. The device specific color appearance look-up table from the ICC device profile of the destination device is then used to transform the image data from the Jab color space to the destination device color space, such as CMYK color space for a printer. The above-described process for gamut-mapping may also be performed with an image-specific, rather than a source device specific, gamut boundary description to achieve more efficient and tailored gamut-mapping of the color image data into the color gamut of the destination device. The color image data in destination device color space is then sent to the destination device for output.

The combination of the conventional image compression scheme and color management scheme described above is inefficient for several reasons. First, the combined processes for compression and color management as described above require four color space transformations to transform the color image data from the initial source device color space to the destination device color space (RGB-YUV-RGB-Jab-CMYK). These transformations are costly in terms of processing overhead every time that a color image file is decompressed and prepared for output on a destination device. Second, the conventional color management scheme requires that the color profile of the source device must be passed along with the compressed JPEG image file in order to support color management prior to outputting the image on a destination device. This results in increased image file size and complexity in image file management.

SUMMARY OF THE INVENTION

The present invention addresses the foregoing problems by providing an image compression and color management scheme which uses the source device color profile to transform color image data into a standardized, color space that is both device and viewing condition independent before compression. Upon subsequent decompression, color management can transform the color image data as needed to accommodate the destination device color profile prior to output of the color image data on the destination device. In addition, the present invention addresses the foregoing problems by providing an image compression and color management scheme in which an image-specific gamut boundary description is extracted from the color image data for use in a color management process prior to output of the color image data on a destination device, thereby avoiding the need for the device profile of the source device during the color management process.

Thus, in a first aspect of the invention, color image data is obtained from a source device which provides the color image data in a source device color space. A source device color profile corresponding to the source device is then accessed, after which the color image data is transformed, through the use of the source device color profile, from the source device color space to a standardized, color space that is both device and viewing condition independent, thereby creating device independent color image data. In the preferred form, the standardized, color space that is both device and viewing condition independent is the Jab color space. The device independent color image data is then compressed to reduce the size of the data. In the preferred form, the compression of the device independent color image data comprises the use of discrete cosine transform (DCT) and Huffman encoding algorithms and the compressed device independent color image data is placed in a file. Also in the preferred form, an image-specific gamut boundary description is extracted from the device independent color image data prior to compression and is placed in a file with the compressed, device independent color image data.

By virtue of this arrangement, the present invention provides compressed color image data in a standardized, color space that is both device and viewing condition independent, whereby the color image data can be accessed, decompressed and then used directly in a color management scheme. The invention therefore reduces the number of color space transformations of the color image data during the compression and color management processes, and furthermore avoids the need to transmit the source device color profile to the recipient, thereby saving processing overhead every time that a color image file is decompressed and prepared for output on a destination device.

In another aspect of the invention, the compressed, device independent color image data, as created pursuant to the discussion immediately above, is accessed and is then decompressed. In the preferred form, the compressed, device independent color image data is accessed from a file and the standardized color space that is both device and viewing condition independent is the Jab color space. Also in the preferred form, the decompression of the device independent color image data comprises the use of inverse discrete cosine transform (DCT) and Huffman decoding algorithms. A destination device color profile corresponding to a destination device is then accessed. The device independent image data is then transformed, through the use of the destination device color profile, from the standardized, color space that is both device and viewing condition independent to the color space of the destination device, thereby creating destination-dependent color image data for output on the destination device.

In addition, preferred embodiments of the invention access an image-specific gamut boundary description, corresponding to the device independent color image data. In the preferred embodiments, the image-specific gamut boundary description is extracted from the device independent color image data prior to compression, and is then placed in a file which contains the compressed device independent color image data. The image-specific gamut boundary description is then accessed from the file. In those embodiments which do not extract the image-specific gamut boundary description from the device independent color image data prior to compression, the image-specific gamut boundary description is extracted from the device independent color image data after decompression for subsequent access and use during color management. The device independent color image data is then mapped from the image-specific gamut boundary description to a destination-specific gamut boundary description which is obtained from the destination device color profile. It is the gamut mapped data that is transformed, as discussed above, to the destination device color space by using the destination device color profile.

By virtue of this arrangement, the present invention provides compressed color image data in a standardized, color space that is both device and viewing condition independent, whereby the color image data can be accessed, decompressed and then used directly in a color management scheme. The invention therefore reduces the number of color space transformations of the color image data during the compression and color management processes, thereby saving processing overhead every time that the color image data is decompressed and prepared for output on a destination device. In addition, the invention reduces the need for the color profile of the source device in order to support color management prior to outputting the image on a destination device. This results in decreased size of the color image data.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
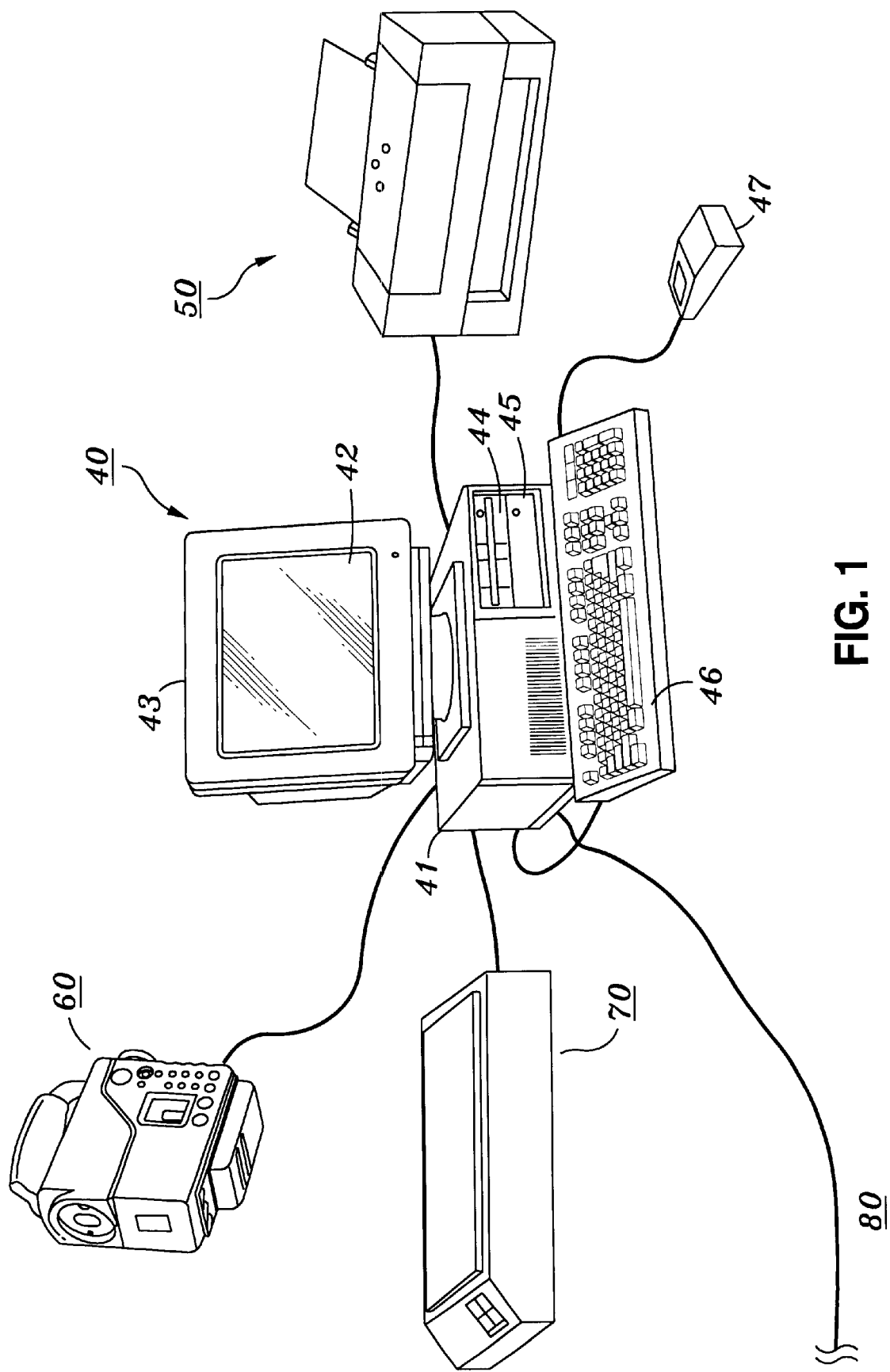
FIG. 1 is a representative view of a computer system in which the present invention may be implemented.

FIG. 1 is a view showing the outward appearance of a representative computing system including computing equipment, peripherals and digital devices which may be used in connection with the practice of the present invention. Computing equipment 40 includes host processor 41 which comprises a personal computer (hereinafter "PC"), preferably an IBM PC-compatible computer having a windowing environment such as Microsoft Windows 95, Windows 98 or Windows NT, although it may be a Macintosh or a non-windows based computer. Provided with computing equipment 40 are color monitor 43 including display screen 42, keyboard 46 for entering text data and user commands, and pointing device 47. Pointing device 47 preferably comprises a mouse for pointing and for manipulating objects displayed on display screen 42.

Computing equipment 40 includes a computer-readable memory medium such as computer fixed disk 45 and/or floppy disk drive 44. Floppy disk drive 44 provides a means whereby computing equipment 40 can access information, such as image data, computer-executable process steps, application programs, etc. stored on removable memory media. A similar CD-ROM interface (not shown) may be provided for computing equipment 40 through which computing equipment 40 can access information stored on removable CD-ROM media.

Printer 50 is a printer, preferably a color bubble jet printer, which forms color images on a recording medium such as paper or transparencies or the like. The invention is usable with other printers, however, so long as the printer is capable of being interfaced to computing equipment 40. In addition, digital color scanner 70 is provided for scanning documents and images into computing equipment 40 and digital color camera 60 is provided for sending digital images to computing equipment 40. Of course, computing equipment 40 may acquire digital image data from other sources such as a digital video camera or from a local area network or the Internet via network interface bus 80.

Figure 2:
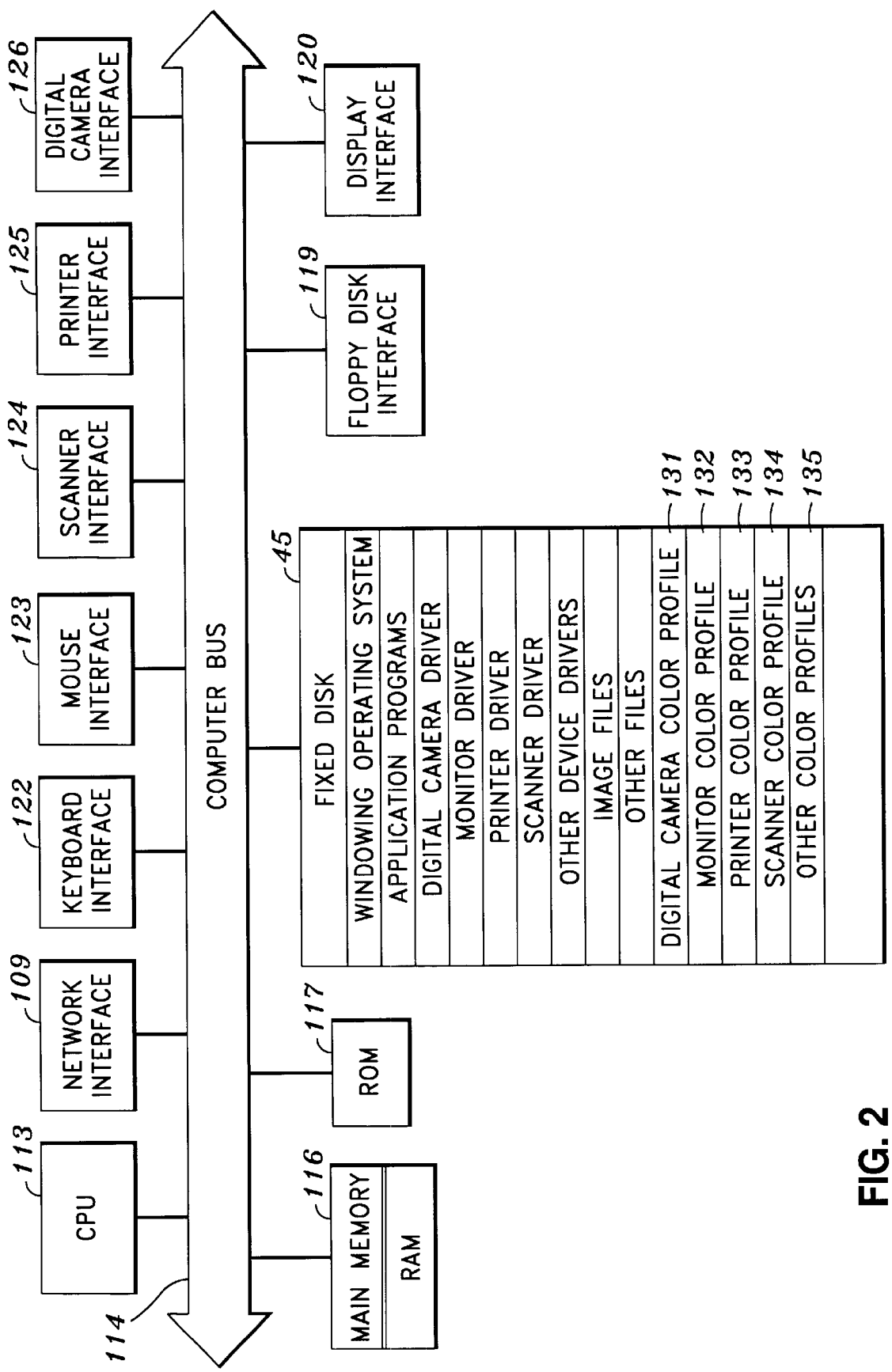
FIG. 2 is a detailed block diagram showing the internal architecture of the computer equipment shown in the computer system of FIG. 1.

FIG. 2 is a detailed block diagram showing the internal architecture of host processor 41 of computing equipment 40. As shown in FIG. 2, host processor 41 includes central processing unit (CPU) 113 which interfaces with computer bus 114. Also interfacing with computer bus 114 are fixed disk 45, network interface 109, main memory (RAM) 116, read only memory (ROM) 117, floppy disk interface 119, display interface 120 to monitor 43, keyboard interface 122 to keyboard 46, mouse interface 123 to mouse 47, scanner interface 124 to scanner 70, printer interface 125 to printer 50, and digital camera interface 126 to digital camera 60.

Main memory 116 interfaces with computer bus 114 so as to provide RAM storage to CPU 113 during execution of software applications and device drivers. More specifically, CPU 113 loads process steps from fixed disk 45, another storage device, or some other source such as a network, into a region of main memory 116. CPU 113 then executes the stored process steps from main memory 116 in order to execute applications and device drivers. Data such as color images can be stored in main memory 116, where the data can be accessed by CPU 113 during execution of the process steps.

As also shown in FIG. 2, fixed disk 45 typically contains an operating system, application programs such as image processing applications, including a color management module, device drivers including digital camera, monitor, printer scanner and other drivers, image files, other files, digital camera color profile 131 for digital camera 60, monitor color profile 132 for monitor 43, printer color profile 133 for printer 50, scanner color profile 134 for scanner 70, and other color profiles 135 for other devices and peripherals (not shown). The present invention is preferably performed by computer-executable process steps which are stored on fixed disk 45 for execution by CPU 113.

Figure 3:
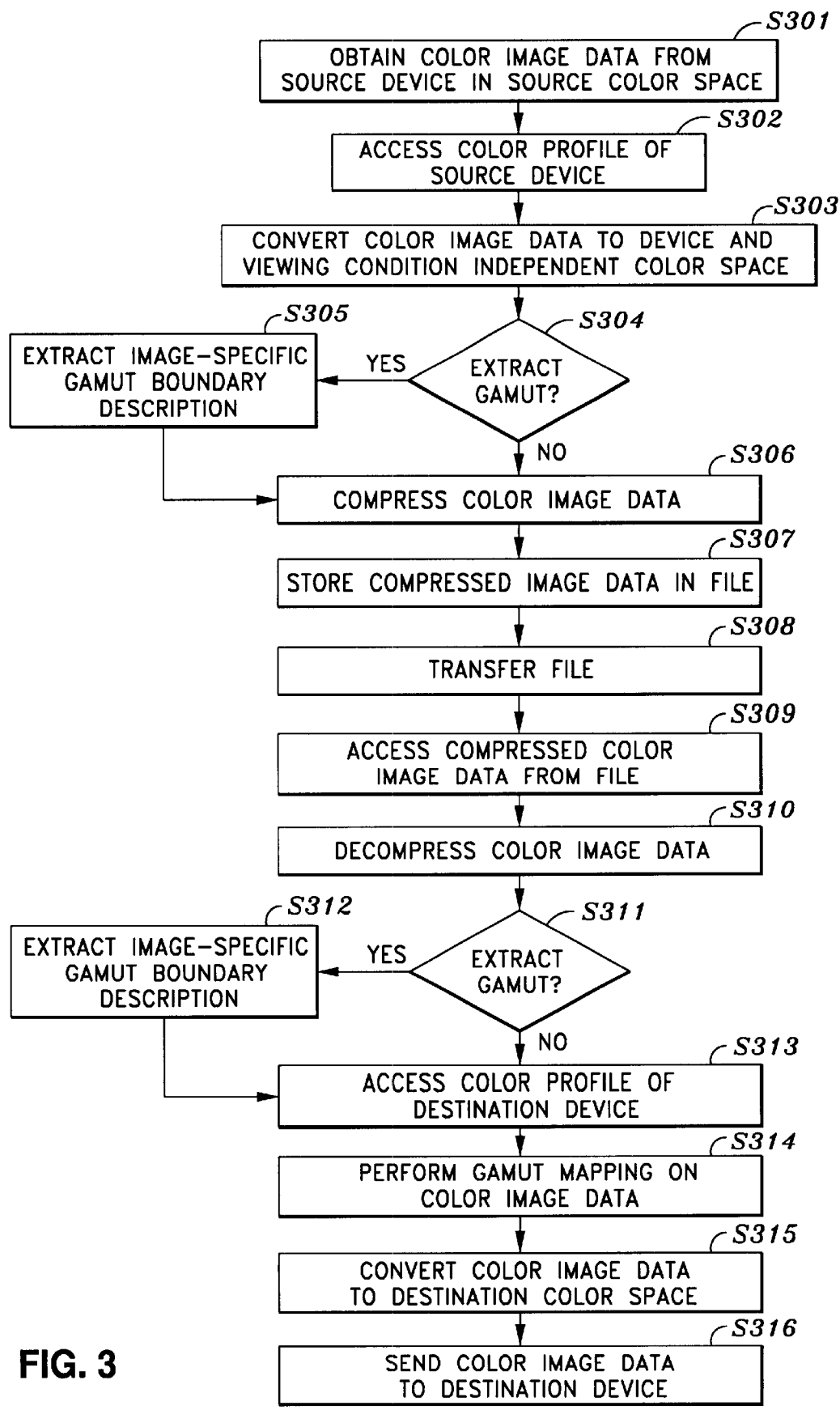
FIG. 3 is a flowchart for providing a system level explanation of the combined image data compression and color management according to the invention.

FIG. 3 is a system level flowchart for explaining the combined image data compression and color management according to the invention. In general, the invention is directed to the creation of a color image file which contains compressed color image data in a standardized, color space that is both device and viewing condition independent, whereby the color image data can be accessed, decompressed and then used directly in a color management scheme for any destination device.

As discussed above, known color management systems and image compression systems are treated separately and therefore result in substantial inefficiencies when combined due to the several color space transformations that take place in each, and due to the need to access the color profiles for both the destination device and the source device for color management purposes every time an image is adjusted for output to a destination device. The present invention reduces these inefficiencies by storing compressed image data in a color space format that is device and viewing condition independent. The color space that is both device and viewing condition independent allows the image data to be transferred to other computing equipment, decompressed and then processed directly by a color management module for output on a destination device without the need for further interim color space transformations.

In addition, the color space that is both device and viewing condition independent allows the image data to be transformed by a color management module from the color space that is both device and viewing condition independent to the destination device color space without the need for the color appearance look-up table corresponding to the source device. Also, instead of using the source device-specific gamut boundary description to perform gamut mapping of the image data into the destination device-specific gamut boundary description, the invention extracts and then uses an image-specific gamut boundary description. In this manner, neither the device-specific color appearance look-up table nor the device-specific gamut boundary description corresponding to the source device are necessary during the color management process. Therefore, the invention also reduces the need to send the color profile of the source device along with the image data for subsequent use in a color management scheme.

As mentioned above, the present invention is preferably performed by computer-executable program steps which are stored in fixed disk 45 of host processor 41 for access by main memory 116 and subsequent execution by CPU 113, of course, the present invention may be carried out through other means such as an application program or a driver such as a monitor driver. The present invention may also be directly implemented in hardware, using technologies such as ASICs.

Turning to step 301 of FIG. 3, the steps for performing the present invention begin by obtaining color image data from a source device such as scanner 70, digital camera 60, or an image retrieved from the Internet via network interface bus 80. For example, color image data corresponding to an image may be obtained from scanner 70 which scans an image and provides color image data to host processor 41 in RGB color space (red, green, blue). Next, after color image data corresponding to an image is provided from a source device, the color profile corresponding to the source device is accessed from fixed disk 45 by CPU 113 for use in the subsequent transformation of the color image data to another color space (step S302). As discussed above, a color profile of a device provides information regarding the color characteristics of that device in comparison to a color standard. The color profile contains a color appearance look-up table and a gamut boundary description each of which is specific to the particular device to which it corresponds. For example, if the color image data was obtained from scanner 70, then the scanner color profile 134 would be accessed for use in the transformation of the color image data obtained in step S301 from the source device color space in which the color image data was provided to another color space. Preferably, the color profiles 131–135 provided in fixed disk 45 are ICC (International Color Consortium) device profiles. ICC device profiles have a standardized format for the color appearance look-up table and gamut boundary description which correspond to a specific device. A color appearance look-up table is utilized to match the colors from one device to another device. In addition, the gamut boundary description is utilized to describe the limitations of the device's ability to produce ranges of colors.

In step S303, the color appearance look-up table from the source device's color profile is utilized to transform the color image data to a color space that is both device and viewing condition independent. This transformation is performed so that the color image data will be in a color space that lends itself to compression of the color image data and that also lends itself to convenient color management at a later point in time when it is desired to adjust the color image data to match the color capabilities of a destination device prior to sending the color image data to the destination device for output. Preferably, the color space that is both device and viewing condition independent is a neutral color space which is not dependent on any particular device or any specific viewing condition. The preferred color space for use in the present invention as a color space that is both device and viewing condition independent is the Jab color space, where Jab is a rectangular coordinate system conversion of the cylindrical coordinate system color space known as Jch. In the Jch color space, "J" stands for lightness, "c" stands for chroma, and "h" stands for hue. This is transformed to Jab color space by the formula a=c*sin(h), and b=c*cos(h). The preferred Jab color space is based upon the 1997 Standardized Interim Color Appearance Model called CIECAM97s, which was standardized by the International Commission on Illumination (CIE). CIECAM97s is a model that can predict color appearance based on an input stimulus and a description of the viewing conditions for that stimulus. For example, if a color image was scanned by scanner 70 in step S301 so as to provide host processor 41 with color image data in RGB format, the color image data is transformed from RGB format in step S303 to Jab format by using the scanner color appearance look-up table contained in scanner color profile 134, thereby transforming the color image data to a color space that is both device and viewing condition independent.

Prior to compressing the color image data after its transformation in step S303 to color space that is both device and viewing condition independent, a determination is made whether it is desired to extract an image-specific gamut boundary description from the transformed color image data prior to compression (step S304). As discussed above, prior-art color management systems require the gamut boundary description from the color profile of both the source device and the destination device in order to map the color image data within the gamut of colors which the destination device is capable of providing. Rather than requiring that the color profile of the source device be transferred along with the color image data for subsequent use by color management systems whenever it is desired to output the image on a destination device, the invention allows an image-specific gamut boundary description to be extracted from the color image data prior to compression such that only the image-specific gamut boundary description need be provided with the color image data for subsequent adjustment by color management systems. This means that the color profile of the source device does not have to be sent along with the color image data whenever color matching is desired prior to output of a color image to a destination device. The color profile of a source device, such as scanner color profile 134 of scanner 70, requires a larger file size than the image-specific gamut boundary description because the color profile includes a color appearance look-up table in addition to a gamut boundary description.

If it is decided to extract an image-specific gamut boundary description from the color image data prior to compression, control passes to step S305 in which the image-specific gamut boundary description of the color image data in device and viewing condition color space is extracted. The use of an image-specific gamut boundary description is generally preferable to the use of the gamut boundary description corresponding to the source device from which the color image data was obtained because the given image may not use the full range of colors that the source device is capable of producing. For example, natural images such as photographs tend to have very few saturated colors. If a color management system uses the gamut boundary description of the source device instead of the image-specific gamut boundary description, there may be needless compression of the color image data. If it is decided that an image-specific gamut boundary description shall not be extracted prior to compression, control moves on to step S306. If the image-specific boundary description is extracted in step S305, control is passed to step S306 after completion of the extraction.

Figure 4:
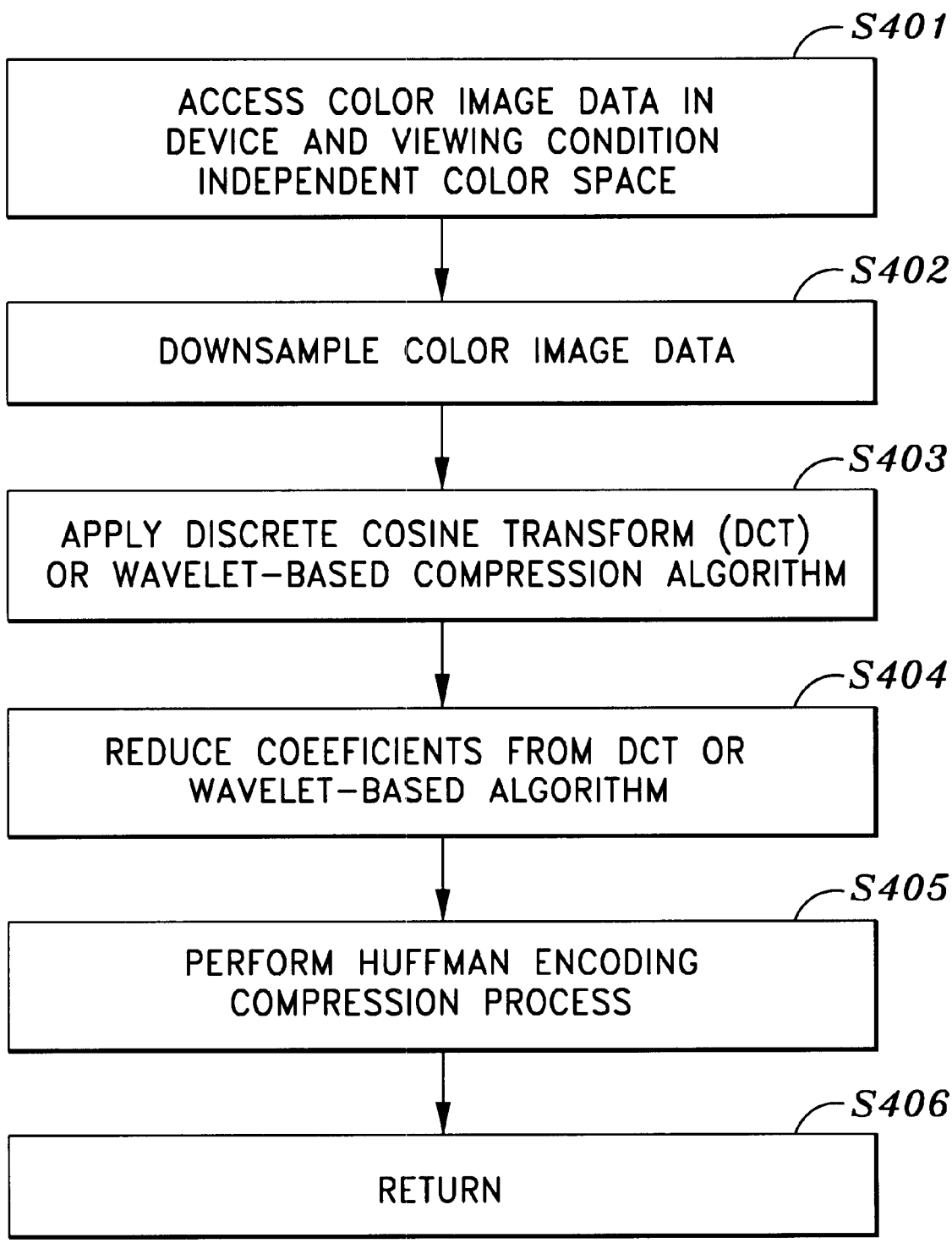
FIG. 4 is a flowchart for providing a detailed explanation of the image data compression according to the invention.

In step S306, the color image data which is in color space that is both device and viewing condition independent is compressed in order to reduce the file size required to contain the color image data. This compression process is discussed in more detail below regarding FIG. 4. Once the color image data which is in color space that is both device and viewing condition independent is compressed, it is placed in a file in step S307. It should be noted that step S307 is a preferred embodiment and that other means may be used to utilize the compressed, device-independent color image data such as transferring the data over a local area network or the Internet for use by another computing device. Therefore, the present invention combines the steps of image data compression and color management so as to provide compressed color image data in a color space that is both device- and viewing condition independent, thereby allowing the compressed color image data to be accessed, decompressed and then adjusted directly by a color management system without the need for further transformations to interim color spaces.

In step S308, the compressed file containing the color image data which is compressed and in a color space that is both device and viewing condition independent is transferred to a computer system generally meeting the same requirements regarding the same components, peripherals, devices, architecture, operating systems, programs, drivers and files as that of computer system 40 in FIG. 1 as discussed above. In addition, the host processor of the other computer system has the same architecture and contains the same operating system, programs, drivers and files as those shown in FIG. 2 as discussed above. It should be noted, however, that the use of another computer system is for purposes of example only, and that the compressed file created in step S307 could simply be stored on fixed disk 45 of host processor 41 of computer system 40 for subsequent access by CPU 113 for output on a destination device such as monitor 43 or printer 50.

After the compressed file is transferred, the color image data is accessed from the compressed file in a color space that is both device and viewing condition independent and in a compressed format (step S309). As discussed above, the use of a file to store and transfer the compressed, device independent color image data is a preferred embodiment, but other means to store and/or transfer the compressed device independent color image data may be used, such as the Internet. In this manner, the data can be accessed directly from the Internet or other means. Once the color image data is accessed, it is then decompressed into a decompressed format but still remains in the color space that is both device and viewing condition independent (step S310). This decompression process is discussed in more detail below regarding FIG. 5. Unlike prior-art compression schemes wherein the decompressed color image data is retransformed into the source device color space which is utilized by the source device, the present invention provides color image data in a device and viewing independent color space as a direct result of decompression, thereby allowing adjustment by a color management system immediately after decompression. In step S311, it is determined whether it is desired to extract the image-specific gamut boundary description from the decompressed color image data which is in color space that is both device and viewing condition independent. As discussed above, this step could have already taken place at steps S304 and S305. In the alternative, the extraction of the image-specific gamut boundary description can take place after transfer and decompression of the color image data. If it is decided to extract the image-specific gamut boundary description in step S311, control passes to step S312 in which the image-specific gamut boundary description is extracted from the decompressed color image data which is in a color space that is both device and viewing condition independent. Control then passes to step S313. If, however, the extraction of the image-specific gamut boundary description has already been performed above in steps S304 and S305, then control passes directly from step S311 to step S313.

At this point, the color image data is decompressed and is in a color space that is both device and viewing condition independent, and an image-specific gamut boundary description has been extracted either prior to compression (step S305) or after transfer and decompression (step S312). The color image data is now ready for color management in order to match the colors of the color image data to the gamut boundary description of the destination device to which the color image data is to be sent and to transform the color image data to the color space utilized by the destination device. For example, if the color image data was initially obtained from scanner 70, it was provided to host processor 41 in RGB color space. Steps S301–S308 would be utilized as described above to transform the color image data from RGB color space to Jab color space, to compress the color image data in Jab color space, to store the compressed color image data in Jab color space in a compressed file, and then to transfer the file for decompression, color management and output to a destination device.

The color management begins in step S313, wherein the color profile of the destination device is accessed so as to obtain the color look-up table and the gamut boundary description which correspond to the destination device. Then, in step S314, gamut mapping is performed whereby the color image data, which is in color space that is both device and viewing condition independent and which is in decompressed format, is mapped from within the image-specific gamut boundary to within the gamut boundary of the destination device. After completion of the gamut mapping, the color appearance look-up table of the destination device is used to transform the color image data from the color space that is both device and viewing condition independent to the destination device color space (step S315). For example, if printer 50 is chosen as the destination device for output of the color image data, then the color image data which is in Jab format is transformed in step S315 to CMYK color space for output to printer 50. After transformation of the color image data to the destination device color space in step S315, control passes to the last step, S316, in which the color image data, which is now in the color space of the destination device and is in a decompressed format, is sent to the destination device for output.

In this manner, the present invention provides a combination of image data compression and color management, thereby reducing the number of color space transformations typically encountered between the two processes and also reducing the need for sending the color profile of the source device along with the color image data for subsequent use during gamut mapping and transformation to the destination device color space prior to sending the color image data to the destination device for output. In the preferred embodiment, the color management system is performed by what is known as a color management module (CMM). In addition, in the preferred embodiment the extraction of the image-specific gamut boundary description is performed at step S305 so that it is only done once prior to compression of the color image data in step S306 instead of extracting the image-specific gamut boundary description every time the color image data is accessed and decompressed for output on a destination device.

As mentioned above, FIG. 4 is a flowchart for providing a detailed explanation of the image data compression which is carried out in step S306 of FIG. 3. Specifically, in step S401 of FIG. 4, the compression process is initiated by accessing the color image data which is in a color space that is both device and viewing condition independent and which is in a decompressed format. Next, in step S402, the color image data is downsampled in limited blocks of data. Specifically, in the preferred mode the color space that is both device and viewing condition independent is a Jab color space wherein the "a" and "b" signals are downsampled into small blocks of data for subsequent compression. In step S403, each downsampled block of color image data is subjected to a discrete cosine transform algorithm for compression purposes. This compression algorithm is utilized in the JPEG compression method. In the alternative, a wavelet-based algorithm may be used in place of the discrete cosine transform (DCT). In either case, the coefficients which result from the application of either the DCT or the wavelet-based algorithm are then quantized and converted to integers in step S404. The color image data is then further compressed by utilizing Huffman encoding in step S405. Huffman encoding is commonly used in JPEG compression. It should be noted that Huffman encoding can be implemented using a predefined Huffman encoding table or by using an image-specific Huffman encoding table for improved compression. After the compression of the color image data in Jab color space is completed in steps S403–S405, control is returned to step S307 of FIG. 3 (step S406).

Figure 5:
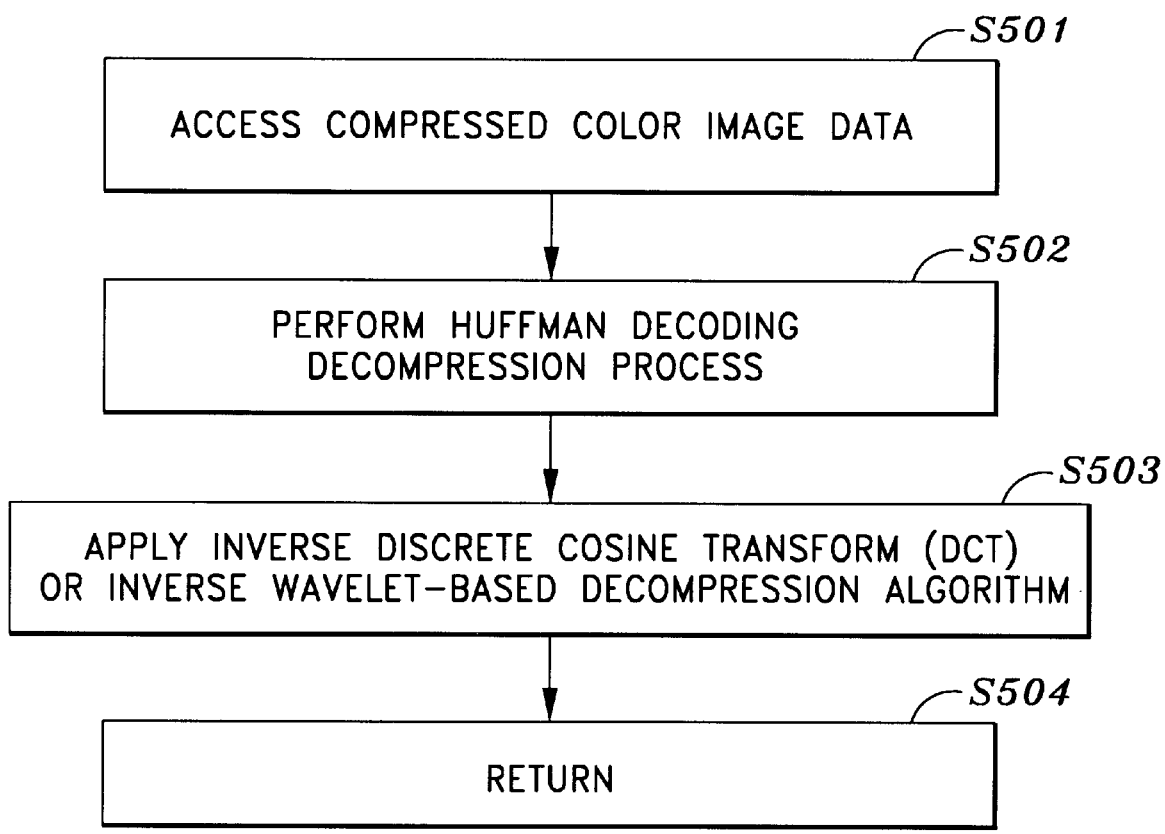
FIG. 5 is a flowchart for providing a detailed explanation of the image data decompression according to the invention.

The reverse of this process is performed in the decompressing step S310 of FIG. 3 as depicted in more detail in FIG. 5. First, in step S501, the color image data, which is in a color space that is both device and viewing condition independent and in a compressed format, is accessed for decompression (step S501). Next, in step S502, the color image data which is in a color space that is both device and viewing condition independent and in a compressed format is subjected to a Huffman decoding process, which is essentially the inverse of the Huffman encoding process described above in relation to step S405 of FIG. 4. The color image data is further decompressed by being subjected to either an inverse DCT algorithm or an inverse wavelet-based algorithm, depending on which algorithm was used to compress the color image data, for completion of the decompression of the color image data (step S503). The resulting color image data is therefore provided in a color space that is both device and viewing condition independent and in a decompressed format. Control is then returned to step S311 of FIG. 3 (step S504).

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A method for management of color image data, said color image data provided in a source device color space from a source device having a source device color profile, said method comprising the steps of:

accessing said source device color profile;

transforming, through the use of said source device color profile, said color image data from said source device color space to a color space that is both device and viewing condition independent, thereby creating device-independent color image data; and compressing said device-independent color image data.

2. A method according to claim 1, further comprising the step of extracting an image-specific gamut boundary description from said device-independent color image data, wherein said extracting step is performed prior to compressing said device-independent color image data.

3. A method according to claim 2, further comprising the step of storing said image-specific gamut boundary description with the compressed device-independent color image data in a data file.

4. A method according to claim 1, further comprising the step of extracting an image-specific gamut boundary description from said device-independent color image data, wherein said extracting step is performed concurrently with said step for transforming said color image data from said source device color space to a color space that is both device and viewing condition independent.

5. A method according to claim 4, further comprising the step of storing said image-specific gamut boundary description with the compressed device-independent color image data in a data file.

6. A method according to claim 1, wherein the source device color space is RGB color space.

7. A method according to claim 1, wherein the color space that is both device and viewing condition independent is Jab color space.

8. A method according to claim 1, wherein said source device color profile contains a color appearance look-up table and a device gamut boundary description.

9. A method according to claim 8, further comprising the step of storing said device gamut boundary description with the compressed device-independent color image data in a data file.

10. A method according to claim 9, wherein the step for transforming said color image data from said source device color space to a color space that is both device and viewing condition independent utilizes said color appearance look-up table from said source device color profile.

11. A method according to claim 1, wherein the step for compressing said device-independent color image data includes discrete cosine transform compression of said device-independent color image data.

12. A method according to claim 1, wherein the step for compressing said device-independent color image data includes Huffman encoding compression of said device-independent color image data.

13. A method according to claim 1, wherein the step for compressing said device-independent color image data includes wavelet-based compression of said device-independent color image data.

14. A method according to claim 1, wherein said source device is a scanning device.

15. A method according to claim 1, further comprising the step of storing the compressed device-independent color image data in a data file.

16. A method for management of color image data for output to a destination device, said color image data provided in a compressed format and in a color space that is both device and viewing condition independent, said destination device utilizing a destination device color space and having a destination device color profile, said method comprising the steps of:

accessing said color image data provided in a color space that is both device and viewing condition independent and in a compressed format;

decompressing said color image data into a color space that is both device and viewing condition independent and in a decompressed format;

accessing said destination device color profile; and transforming, through the use of said destination device color profile, said color image data from said color space that is both device and viewing condition independent to said destination device color space, thereby creating destination-dependent color image data for output on said destination device.

17. A method according to claim 16, further comprising the step of accessing a source gamut boundary description corresponding to a source device from which said color image data was originally obtained, and the step of mapping said color image data from within a source gamut boundary described in said source gamut boundary description to within a destination gamut boundary described in a destination gamut boundary description which corresponds to said destination device.

18. A method according to claim 17, wherein said source gamut boundary description is accessed from a data file.

19. A method according to claim 17, wherein said source gamut boundary description is accessed from a data file which also contains said color image data.

20. A method according to claim 17, wherein said destination gamut boundary description is provided in said destination device color profile.

21. A method according to claim 16, further comprising the step of accessing an image-specific gamut boundary description corresponding to said color image data, and the step of mapping said color image data from within an image-specific gamut boundary described in said image-specific gamut boundary description to within a destination gamut boundary described in a destination gamut boundary description which corresponds to said destination device.

22. A method according to claim 21, wherein said image-specific gamut boundary description is accessed from a data file.

23. A method according to claim 21, wherein said image-specific gamut boundary description is accessed from a data file which also contains said color image data.

24. A method according to claim 21, wherein said destination gamut boundary description is provided in said destination device color profile.

25. A method according to claim 21, wherein the step of accessing said image-specific gamut boundary description includes extracting said image-specific gamut boundary description from said color image data after the step of decompressing said color image data.

26. A method according to claim 21, wherein the step of accessing said image-specific gamut boundary description includes extracting said image-specific gamut boundary description from said color image data concurrent with the step of decompressing said color image data.

27. A method according to claim 16, wherein the destination device color space is CMYK color space.

28. A method according to claim 16, wherein the color space that is both device and viewing condition independent is Jab color space.

29. A method according to claim 16, wherein said destination device color profile contains a color appearance look-up table.

30. A method according to claim 29, wherein said step for transforming said color image data from said color space that is both device and viewing condition independent to said destination device color space utilizes said color appearance look-up table of said destination device color profile.

31. A method according to claim 16, wherein the step for decompressing said color image data includes inverse discrete cosine transform decompression.

32. A method according to claim 16, wherein the step for decompressing said color image data includes Huffman decoding decompression.

33. A method according to claim 16, wherein the step for decompressing said color image data includes inverse wavelet-based decompression.

34. A method according to claim 16, wherein said destination device is a printer.

35. A method according to claim 16, further comprising the step of storing said destination-dependent color image data in a data file.

36. A method for management of color image data for output of the color image data to a destination device, said color image data provided in a source device color space from a source device having a source device color profile which contains a source color appearance look-up table and a source gamut boundary description, said destination device utilizing a destination device color space and having a destination device color profile which contains a destination color appearance look-up table and a destination gamut boundary description, said method comprising the steps of:

accessing said source color appearance look-up table from said source device color profile;

transforming, through the use of said source color appearance look-up table, said color image data from said source device color space to a color space that is both device and viewing condition independent, thereby creating device-independent color image data;

compressing said device-independent color image data in a color space that is both device and viewing condition independent and in a compressed format;

transferring said device-independent color image data in a color space that is both device and viewing condition independent and in a compressed format;

accessing said device-independent color image data in a color space that is both device and viewing condition independent and in a compressed format;

decompressing said device-independent color image data into a color space that is both device and viewing condition independent and in a decompressed format;

accessing an image-specific gamut boundary description corresponding to said device-independent color image data;

accessing said destination color appearance look-up table and said destination gamut boundary description from said destination device color profile;

mapping said device-independent color image data from within an image-specific gamut boundary described in said image-specific gamut boundary description to within a destination gamut boundary described in said destination gamut boundary description; and transforming, through the use of said destination color appearance look-up table, said device-independent color image data to said destination device color space, thereby creating destination-dependent color image data for output on said destination device.

37. An apparatus for management of color image data for output of the color image data to a destination device, said color image data provided in a source device color space from a source device having a source device color profile which contains a source color appearance look-up table and a source gamut boundary description, said destination device utilizing a destination device color space and having a destination device color profile which contains a destination color appearance look-up table and a destination gamut boundary description, comprising:

a program memory for storing process steps executable to perform a method according to any of claims 1 to 36; and a processor for executing the process steps stored in said program memory.

38. Computer-executable process steps stored on a computer readable medium, said computer-executable process steps for management of color image data for output of the color image data to a destination device, said color image data provided in a source device color space from a source device having a source device color profile which contains a source color appearance look-up table and a source gamut boundary description, said destination device utilizing a destination device color space and having a destination device color profile which contains a destination color appearance look-up table and a destination gamut boundary description, said computer-executable process steps comprising process steps executable to perform a method according to any of claims 1 to 36.

39. A computer-readable medium which stores computer-executable process steps, the computer-executable process steps to manage color image data for output of the color image data to a destination device, said color image data provided in a source device color space from a source device having a source device color profile which contains a source color appearance look-up table and a source gamut boundary description, said destination device utilizing a destination device color space and having a destination device color profile which contains a destination color appearance look-up table and a destination gamut boundary description, said computer-executable process steps comprising process steps executable to perform a method according to any of claims 1 to 36.

* * * * *